US008808128B2

(12) United States Patent
Sada et al.

(10) Patent No.: US 8,808,128 B2
(45) Date of Patent: *Aug. 19, 2014

(54) HYBRID DRIVE SYSTEM

(75) Inventors: Natsuki Sada, Anjo (JP); Tomoo Atarashi, Kariya (JP); Hirotaka Yata, Kariya (JP); Tomoaki Nishizuru, Anjo (JP); Michitaka Tsuchida, Miyoshi (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/582,397

(22) PCT Filed: Feb. 10, 2011

(86) PCT No.: PCT/JP2011/053872
§ 371 (c)(1),
(2), (4) Date: Sep. 21, 2012

(87) PCT Pub. No.: WO2011/111519
PCT Pub. Date: Sep. 15, 2011

(65) Prior Publication Data
US 2013/0008284 A1 Jan. 10, 2013

(30) Foreign Application Priority Data
Mar. 9, 2010 (JP) .................................. 2010-051859

(51) Int. Cl.
| F16H 37/06 | (2006.01) |
| B60K 6/445 | (2007.10) |
| F16H 3/72 | (2006.01) |
| B60K 6/40 | (2007.10) |
| F16H 37/08 | (2006.01) |
| F16H 57/08 | (2006.01) |

(52) U.S. Cl.
CPC ........ *F16H 3/727* (2013.01); *F16H 2037/0866* (2013.01); *F16H 57/082* (2013.01); *B60K 6/445* (2013.01); *Y02T 10/6239* (2013.01); *B60K 6/40* (2013.01); *Y10S 475/90* (2013.01)
USPC .............................. 475/151; 475/5; 475/900

(58) Field of Classification Search
USPC ............................... 475/5, 149, 151, 317, 900
See application file for complete search history.

(56) References Cited

U.S. PATENT DOCUMENTS

| 6,166,498 | A | 12/2000 | Yamaguchi et al. |
| 6,692,394 | B2 * | 2/2004 | Takenaka ........................ 475/5 |

(Continued)

FOREIGN PATENT DOCUMENTS

| DE | 101 40 366 A1 | 7/2003 |
| EP | 1220423 A2 * | 7/2002 |

(Continued)

OTHER PUBLICATIONS

International Search Report issued in International Application No. PCT/JP2011/053872 on Jun. 16, 2011.

(Continued)

*Primary Examiner* — Troy Chambers
*Assistant Examiner* — Lillian Nguyen
(74) *Attorney, Agent, or Firm* — Oliff PLC (57) ABSTRACT

A hybrid drive system includes an input member, a rotating electric machine, a power distributing apparatus that distributes and transmits torque that is transmitted to the input member to the rotating electric machine and an output member, an output gear capable of outputting torque transmitted to the output member, and an output bearing that is rotatably supports the output member from the radially inner side. The entire apparatus is arranged overlapping with the output member at a position in an axial direction on the radially inner side of the output member, and a ring gear of the apparatus is integrally provided with the output member, on an inner peripheral surface of the output member. The output gear is integrally provided with the output member, on an outer peripheral surface of the output member. The output bearing and the output gear are arranged overlapping at a position in the axial direction.

17 Claims, 4 Drawing Sheets

(56) References Cited

U.S. PATENT DOCUMENTS

| | | | |
|---|---|---|---|
| 7,001,296 B2 | 2/2006 | Yamauchi et al. | |
| 8,645,037 B2 | 2/2014 | Kato et al. | |
| 2001/0050190 A1* | 12/2001 | Takenaka | 180/65.2 |
| 2004/0121870 A1 | 6/2004 | Takenaka et al. | |
| 2007/0135255 A1 | 6/2007 | Kim et al. | |
| 2009/0014222 A1 | 1/2009 | Tatematsu et al. | |
| 2009/0023529 A1 | 1/2009 | Sanji et al. | |
| 2009/0065274 A1 | 3/2009 | Kano et al. | |
| 2009/0098969 A1 | 4/2009 | Tabata et al. | |
| 2009/0267352 A1 | 10/2009 | Sada et al. | |
| 2009/0295242 A1 | 12/2009 | Yamamoto et al. | |
| 2011/0039649 A1* | 2/2011 | Tanae et al. | 475/5 |
| 2011/0113782 A1 | 5/2011 | Tsuchida et al. | |
| 2012/0143422 A1 | 6/2012 | Kitahata et al. | |
| 2012/0329594 A1* | 12/2012 | Sada et al. | 475/5 |
| 2013/0184111 A1* | 7/2013 | Sada et al. | 475/5 |

FOREIGN PATENT DOCUMENTS

| | | |
|---|---|---|
| JP | A-2000-217205 | 8/2000 |
| JP | A-2001-355727 | 12/2001 |
| JP | A-2003-148595 | 5/2003 |
| JP | A-2003-191760 | 7/2003 |
| JP | A-2006-29363 | 2/2006 |
| JP | A-2007-159287 | 6/2007 |
| JP | A-2009-108947 | 5/2009 |
| JP | A-2009-143348 | 7/2009 |
| JP | A-2009-166740 | 7/2009 |
| JP | A-2009-179205 | 8/2009 |
| JP | A-2009-257518 | 11/2009 |
| JP | A-2009-262858 | 11/2009 |
| JP | A-2009-286367 | 12/2009 |
| JP | A-2010-036820 | 2/2010 |
| WO | WO 2009/011240 A1 | 1/2009 |

OTHER PUBLICATIONS

Written Opinion of the International Searching Authority issued in International Application No. PCT/JP2011/053872 on Jun. 16, 2011.
Nov. 8, 2012 English Translation of Japanese Office Action issued in Japanese Patent Application No. 2010-051859.
Jun. 16, 2011 International Search Report issued in International Patent Application No. PCT/JP2011/053873.
U.S. Appl. No. 13/601,759, filed Aug. 31, 2012 in the name of Sada et al.
U.S. Appl. No. 13/601,865, filed Aug. 31, 2012 in the name of Sada et al.
U.S. Appl. No. 13/581,589, filed Aug. 28, 2012 in the name of Sada et al.
Mar. 27, 2014 Office Action issued in U.S. Appl. No. 13/601,865.
Written Opinion of the International Searching Authority issued in International Application No. PCT/JP2011/053873 dated Jun. 16, 2011.
Partial translation of Japanese Office Action issued in Japanese Patent Application No. 2010-051858 dated Nov. 8, 2012.
Mar. 12, 2014 Office Action issued in U.S. Appl. No. 13/601,759.
May 22, 2014 Office Action issued in U.S. Appl. No. 13/581,589.

* cited by examiner

HYBRID DRIVE SYSTEM

1. FIELD OF THE INVENTION

The present invention relates to a hybrid drive system that includes an input member that is drivingly connected to an engine, a rotating electric machine, a power distributing apparatus (i.e., a power transfer) that distributes and transmits torque transmitted to the input member to the rotating electric machine and an output member, and an output gear capable of outputting torque transmitted to the output member to a wheel side.

2. DESCRIPTION OF THE RELATED ART

Japanese Patent Application Publication No. 2000-217205 (JP-A-2000-217205), for example, describes one such known hybrid drive system. In the system described in JP-A-2000-217205, a ring gear (R) that serves as an output rotating element of a power distributing apparatus (i.e., a planetary gear unit 13) is integrally formed with an output member that is formed in a circular shape, on an inner peripheral surface of the output member, and the output member is connected, via a flange-shaped connecting member that extends in a radial direction, to a sleeve-shaped member (i.e., an output shaft 14) formed surrounding an input member (i.e., an output shaft 12), as shown in FIGS. 2 and 4 of JP-A-2000-217205. The sleeve-shaped member is arranged on an engine side in an axial direction and on a radially inner side, with respect to the output member. A counter drive gear (15) that serves as an output gear is formed on an outer peripheral surface of the sleeve-shaped member on an end portion of the sleeve-shaped member that is on the engine side in the axial direction.

A rotor of a rotating electric machine (i.e., a motor-generator 16) and the output member that are rotating members inside a case (10) need to be rotatably supported with respect to a non rotating member such as the case, so these are supported by a rotor bearing and an output bearing, respectively. Here, with the hybrid system described in JP-A-2000-217205, an output bearing is arranged between the case and the sleeve-shaped member, and the rotor bearing is arranged between the case and a rotor shaft of the rotating electric machine. The output member is connected to the rotor shaft of the rotating electric machine via the ring gear that is integrally formed with the output member, and another rotating element of the power distributing apparatus. The output member is also connected to the sleeve-shaped member via a connecting member. Therefore, the output member is rotatably supported by the case via the rotor bearing and the rotor shaft of the rotating electric machine, as well as the sleeve-shaped member and the output bearing. At this time, the output bearing is arranged contacting an outer peripheral surface of the sleeve-shaped member that has a relatively small diameter, so an output bearing having a relatively small diameter can be used. As a result, the cost of the output bearing can be reduced, which enables the overall manufacturing cost of the hybrid drive system to be reduced.

However, with the hybrid drive system described in JP-A-2000-217205, the power distributing apparatus, the output bearing, and the output gear are arranged lined up at predetermined intervals in different positions in the axial direction. With this kind of arrangement, the power distributing apparatus and the output gear occupy a large area in the axial direction, which ends up increasing the dimensions of the overall hybrid drive system in the axial direction. Also, the output bearing is arranged contacting the outer peripheral surface of the sleeve-shaped member, so the position in the axial direction where the output gear is integrally formed on the outer peripheral surface of the same sleeve-shaped member is limited by the output bearing. Therefore, the degree of freedom regarding the position in the axial direction of the output gear is reduced, so the degree of freedom regarding the positions in the axial direction of various structures arranged downstream of the output gear in the power transmitting path is also reduced. From this point as well, this configuration also tends to lead to an increase in the dimensions of the overall hybrid drive system in the axial direction.

Therefore, the realization of a hybrid drive system in which the overall system can be made shorter in the axial direction is desired.

SUMMARY OF THE INVENTION

An aspect of the present invention relates to a hybrid drive system that includes an input member that is drivingly connected to an engine, a rotating electric machine, a power distributing apparatus that distributes and transmits torque that is transmitted to the input member to the rotating electric machine and an output member, and an output gear capable of outputting torque transmitted to the output member to a wheel side. The hybrid drive system includes an output bearing that is arranged on a radially inner side of the output member and rotatably supports the output member from the radially inner side. The entire power distributing apparatus is arranged overlapping with the output member at a position in an axial direction on the radially inner side of the output member, and a ring gear of the power distributing apparatus is integrally provided with the output member, on an inner peripheral surface of the output member. The output gear is integrally provided with the output member, on an outer peripheral surface of the output member. The output bearing and the output gear are arranged overlapping at a position in the axial direction.

Incidentally, the term "drivingly connected" in this application refers to a state in which two rotating elements are connected in such a way that driving force can be transmitted, and is used as a concept that includes a state in which the two rotating elements are connected so as to rotate together, and a state in which the two rotating elements are connected such that driving force can be transmitted via one or two or more transmitting members.

Also, the term "rotating electric machine" is used as a concept that includes a motor (i.e., an electric motor), a generator (i.e., an electric generator), and a motor-generator that functions as both a motor and a generator when necessary.

Also in this application, the term "overlap" in a given direction of two members means that each of the two members has at least a portion that is in the same position in terms of the arrangement in the given direction.

According to the structure described above, the entire power distributing apparatus is arranged overlapping with the output member at a position in the axial direction on the radially inner side of the output member, so the power distributing apparatus can be arranged in the space that is occupied by the output member in the axial direction. Also, the output gear is integrally provided on the outer peripheral surface of the output member, so the output gear can also be arranged within the space occupied by the output member in the axial direction. Accordingly, the power distributing apparatus and the output gear can fit into the space occupied by the output member, so the length of the space occupied by the output member, the power distributing apparatus, and the output gear in the axial direction can be made shorter.

Also, the output bearing that rotatably supports the output member is arranged on the radially inner side of the output member, so the output gear can be integrally provided on the outer peripheral surface of the output member without the position of the output gear in the axial direction being restricted by the output bearing. That is, the degree of freedom regarding the position of the output gear in the axial direction can be increased. Therefore, even if the output bearing is arranged so as to support an end portion of the output member in the axial direction in order to maintain precise axial alignment of the output member, the output gear can be arranged overlapping with the output bearing at a position in the axial direction, so the output gear can be arranged nearer an end portion of the output member in the axial direction. Accordingly, the various structures that are arranged downstream of the output gear in the power transmitting path can also be arranged nearer the end portion of the output member in the axial direction. As a result, the various structures arranged downstream of the output gear can be easily arranged in appropriate positions in the axial direction.

Accordingly, the length of the space occupied by the output member, the power distributing apparatus, the output gear, and the various structures arranged downstream of output gear in the axial direction can be effectively shortened. Therefore, a hybrid drive system in which the dimensions of the overall system in the axial direction can be shortened is able to be provided.

The hybrid drive system of the aspect of the present invention may also include a rotor bearing that rotatably supports a rotor of the rotating electric machine; a differential gear unit that has a differential input gear and distributes and transmits torque that is transmitted to the differential input gear to a plurality of the wheels; and a counter gear mechanism that has a first gear that meshes with the output gear, and a second gear that meshes with the differential input gear, the counter gear mechanism being formed such that the first gear and the second gear rotate together. The second gear and the rotor bearing may be arranged overlapping at a position in the axial direction.

In the hybrid drive system, the output bearing may be provided as a first output bearing. The hybrid drive system may also include a rotor bearing that rotatably supports a rotor of the rotating electric machine; and a second output bearing that is arranged so as to support the output member at a different position in the axial direction than a position where the first output bearing is arranged. The second output bearing and the rotor bearing may be arranged overlapping at a position in the axial direction.

In the hybrid drive system, the rotating electric machine may be provided as a first rotating electric machine. The hybrid drive system may also include a second rotating electric machine arranged on a different axis than an axis that the first rotating electric machine is arranged on. The output gear may be drivingly connected to the second rotating electric machine.

Here, the hybrid drive system described above may also include a rotor bearing that rotatably supports a rotor of the first rotating electric machine, a differential gear unit that has a differential input gear and distributes and transmits torque that is transmitted to the differential input gear to a plurality of the wheels, and a counter gear mechanism that has a first gear that meshes with the output gear, and a second gear that meshes with the differential input gear, the counter gear mechanism being formed such that the first gear and the second gear rotate together. The second gear and the rotor bearing may be arranged overlapping at a position in the axial direction.

According to this structure, torque of the input member (i.e., engine torque) that is transmitted to the output member can be transmitted to the wheel side via the counter gear mechanism and the differential gear unit.

Also with this structure, the rotor bearing and the second gear of the counter gear mechanism are arranged overlapping at a position in the axial direction. Normally, the first gear and the second gear of the counter gear mechanism are often arranged lined up in the axial direction with a relatively small space between them. When the rotor bearing and the second gear of the counter gear mechanism are arranged overlapping in the axial direction as they are in the structure described above, the rotor bearing and the rotor of the first rotating electric machine that is rotatably supported by the rotor bearing can be arranged near the side of the output member on which the output gear is formed in the axial direction. Accordingly, the first rotating electric machine can be arranged near the output member side, so the dimensions of the overall system in the axial direction can be shortened by also taking into account the arrangement of the first rotating electric machine.

In the hybrid drive system described above, a length of the first gear in the axial direction may be set longer than a length of the output gear in the axial direction, and an intermesh position of the first gear and the output gear may be set such that a non-meshing portion that is a portion of the first gear that is not in mesh with the output gear is positioned on a side on which the input member is connected to the engine, in the axial direction. Further, the first gear may be drivingly connected to the second rotating electric machine.

In a hybrid drive system having a structure in which a second rotating electric machine is drivingly connected to an output gear capable of outputting torque that is transmitted to an output member to a wheel side, a structure may be employed in which both the output gear and a gear capable of outputting torque from the second rotating electric machine (hereinafter this gear will be referred to as a "second rotating electric machine output gear") are in mesh with a first gear of a counter gear mechanism. With this kind of structure, normally the second rotating electric machine outputs a large amount of assist torque for driving the vehicle, so when comparing the maximum value of torque able to be transmitted from the output gear to the first gear with the maximum value of torque able to be transmitted from the second rotating electric machine output gear to the first gear, the latter is often set to a larger value. Consequently, the length of the second rotating electric machine output gear in the axial direction is often set longer than the length of the output gear in the axial direction. In such a case, if the torque output from the second rotating electric machine is to be efficiently transmitted to the first gear while inhibiting an increase in the axial dimensions of the overall system, the length of the first gear in the axial direction is set equal to the length of the second rotating electric machine output gear in the axial direction, so the length of the first gear in the axial direction is set longer than the length of the output gear in the axial direction.

According to this structure, an open space formed in a predetermined position from an input member in the radial direction on the engine side in the axial direction can be used efficiently, presuming the lengths of the first gear and the output gear in the axial direction as set as described above, and a non-meshing portion of the first gear, that is excess with respect to the output gear, can be arranged in the open space. Accordingly, the dimensions of the overall system in the axial direction can be shortened while enabling both torque that is transmitted to the output member and torque from the second rotating electric machine to be efficiently transmitted to the counter gear mechanism and the wheel side.

In the hybrid drive system described above, the output bearing may be provided as a first output bearing. The hybrid drive system may also include a rotor bearing that rotatably supports a rotor of the first rotating electric machine; and a second output bearing that is arranged so as to support the output member at a different position in an axial direction than a position where the first output bearing is arranged. Also, the second output bearing and the rotor bearing may be arranged overlapping at a position in the axial direction.

According to this structure, the second output bearing that rotatably supports the output member is arranged overlapping at a position in the axial direction with the rotor bearing that rotatably supports the rotor of the first rotating electric machine. Therefore, the length of the space occupied by the second output bearing and the rotor bearing in the axial direction can be shortened by at least the amount that these overlap with each other, compared with when they are arranged in different positions in the axial direction. Also, as a result, the output member that is rotatably supported by the second output bearing and the rotor of the first rotating electric machine that is rotatably supported by the rotor bearing can be arranged close to one another in the axial direction. Accordingly, the length of the space occupied by the first rotating electric machine and the output member in the axial direction can be shortened significantly. As a result, the dimensions of the overall system in the axial direction can be shortened by also taking into account the arrangement of the first rotating electric machine.

The hybrid drive system described above may also include a case in which the input member, the first rotating electric machine, the second rotating electric machine, the power distributing apparatus, the output member, and the output gear are housed. The case may have a supporting wall that extends in a radial direction, and a circular cylindrical portion that is integrally formed with the supporting wall and extends in the axial direction, and the second output bearing may be arranged contacting an outer peripheral surface of the cylindrical portion, and the rotor bearing may be arranged contacting an inner peripheral surface of the cylindrical portion.

According to this structure, a structure in which the rotor bearing and the second output bearing are arranged overlapping one another in the axial direction can be easily realized in an appropriate manner by arranging the rotor bearing and the second output bearing such that they contact the inner peripheral surface and the outer peripheral surface, respectively, of the cylindrical portion that is integrally formed with the supporting wall of the case. Also, the structure of the case can be simplified, thus enabling manufacturing costs to be reduced, by sharing the portion for arranging the rotor bearing and the second output bearing inside the case.

The hybrid drive system described above may also include a lock mechanism that has a gear portion and a pawl portion that is formed so as to be able to pivot about a predetermined fulcrum, and forcibly stops the output member from rotating while the pawl portion is engaged with the gear portion. The gear portion may be integrally provided with the output member on an outer peripheral surface of the output member and in a different position in the axial direction than a position of the output gear.

According to this structure, engaging the pawl portion with the gear portion of the lock mechanism forcibly stops the output member from rotating, such that the wheels can be prohibited from rotating. Accordingly, the hybrid drive system is able to have a parking lock function for keeping the vehicle completely stopped.

At this time, making the structure such that the gear portion is provided in a different position in the axial direction than the output gear enables the gear portion to be integrally provided on the outer peripheral surface of the output member without interfering with the output gear. As a result, the gear portion is able to fit into the space occupied by the power distributing apparatus, the output gear, and the output member, so the lock mechanism can be formed while an increase in the length in the axial direction can be suppressed.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF THE EMBODIMENTS

Example embodiments of a hybrid drive system according to the present invention will now be described with reference to the accompanying drawings. This hybrid drive system 1 is a drive system for a hybrid vehicle that is capable of running using both an engine E and rotating electric machines (i.e., motor-generators) MG1 and MG2 as driving force sources. The hybrid drive system 1 according to this example embodiment is a hybrid drive system for an FF (Front Engine Front Drive) vehicle, and is arranged adjacent, in the width direction of the vehicle, to the engine E that is transverse mounted in the vehicle, and connected to the engine E in an axial direction of an output shaft Eo of the engine E.

This hybrid drive system 1 is configured as a so-called two-motor split type hybrid drive system. The hybrid drive system 1 includes an input shaft I that is drivingly connected to the engine E, a first motor-generator MG1 that has a first rotor Ro1, a power distributing apparatus (hereinafter referred to as a power transfer) PT that distributes and transmits torque from the engine E that is transmitted to the input shaft I to the first motor-generator MG1 and an output member 21, and an output gear 22 capable of outputting torque transmitted to the output member 21 to a wheel W side. Also, a second motor-generator MG2 is drivingly connected to the output member 21 and the output gear 22 via a counter gear mechanism C. In this kind of structure, the hybrid drive system 1 according to this example embodiment includes the arrangement of the power transfer PT, the output member 21, and the output gear 22, and the arrangement of an output bearing 61, that rotatably supports the output gear 22 and the output member 21.

Figure 3:
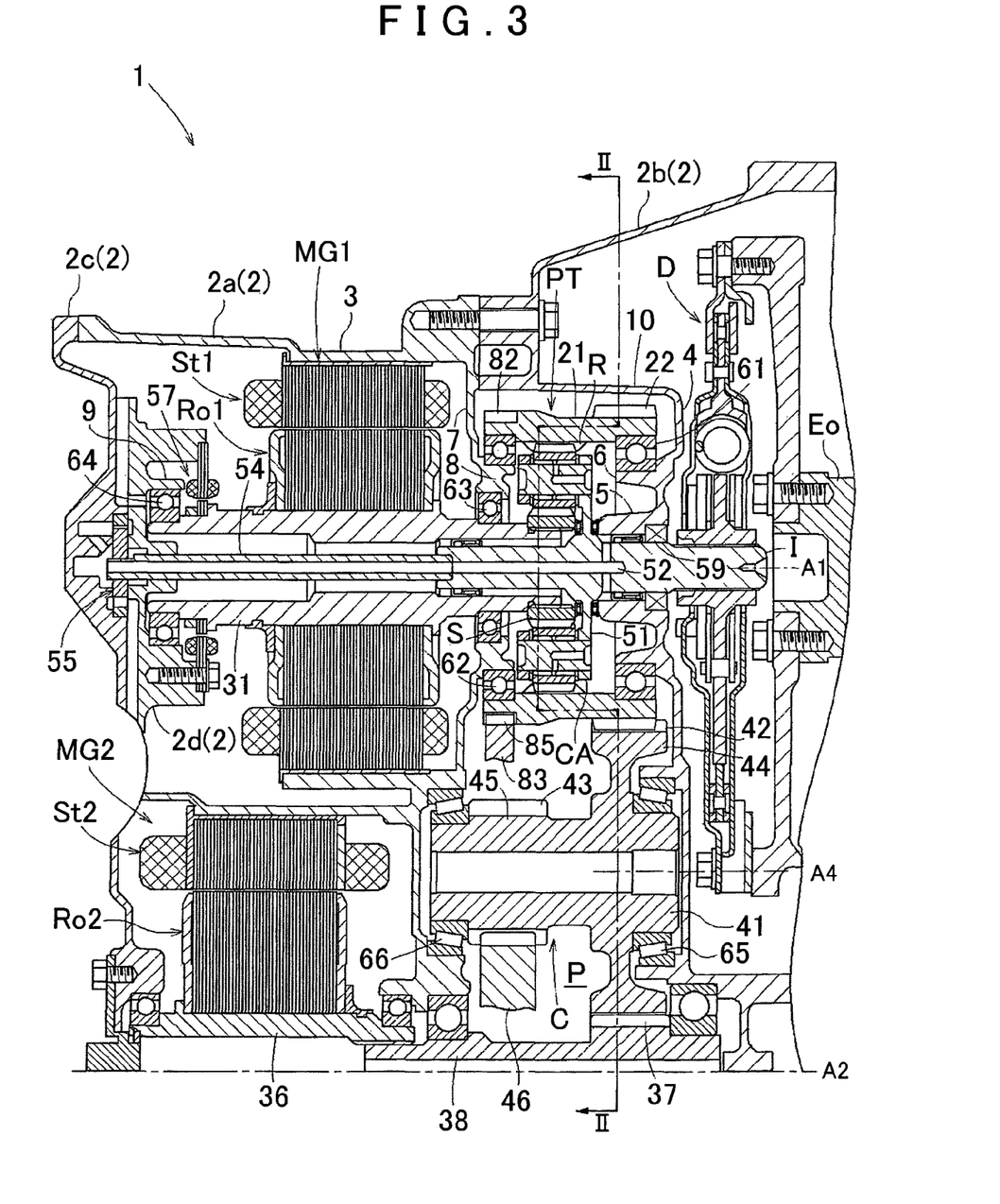
FIG. 3 is an expanded sectional view in the axial direction of the hybrid drive system according to the example embodiment of the present invention.
Figure 4:
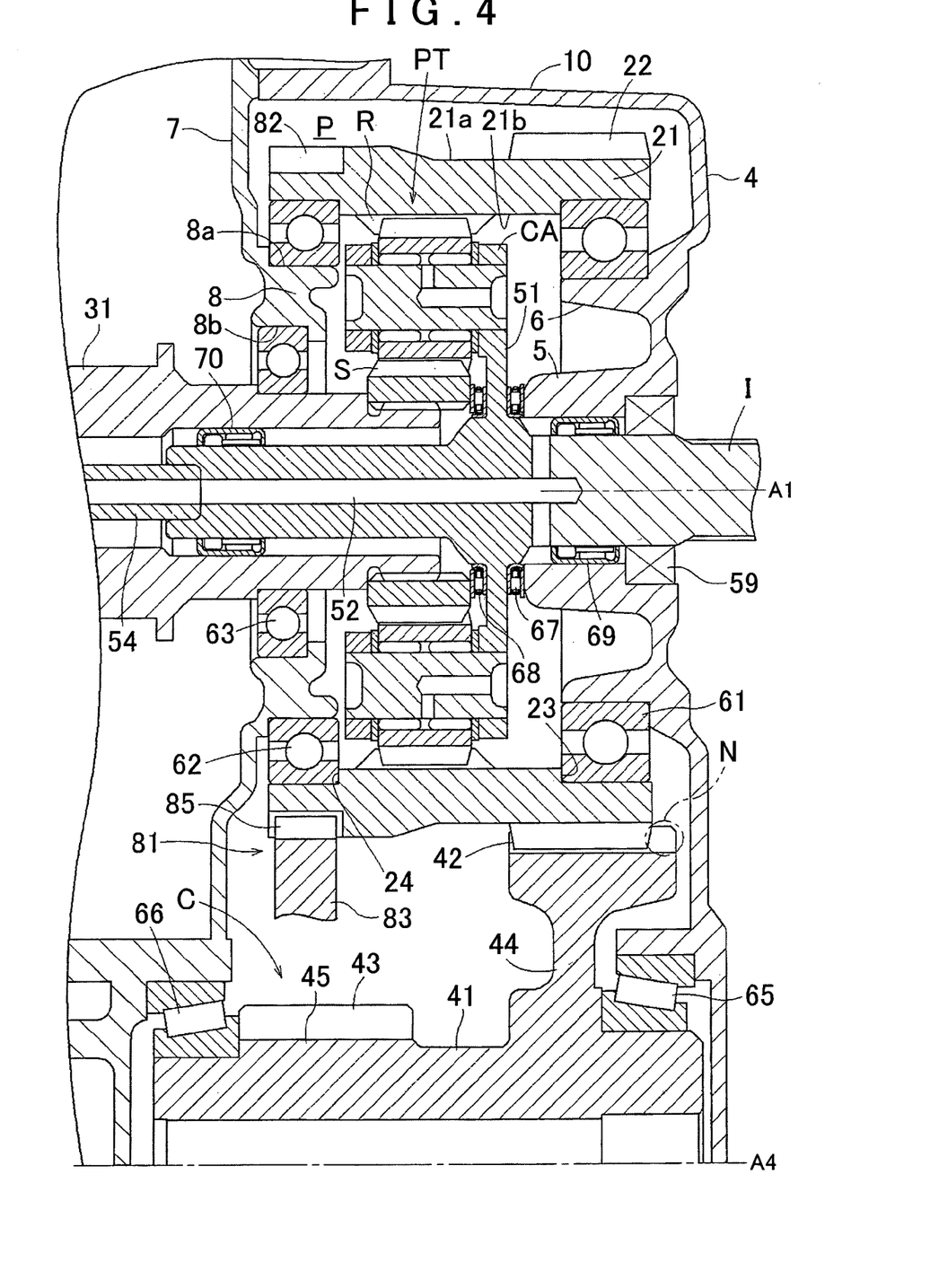
FIG. 4 is a sectional view of the main portions of the hybrid drive system according to the example embodiment of the present invention.

That is, as shown in FIGS. 3 and 4, the entire power transfer PT is arranged overlapping with the output member 21 in the axial direction on the radially inner side of the output member 21. A ring gear R of the power transfer PT is integrally provided with the output member 21 on an inner peripheral surface 21*b* of the output member 21, and the output gear 22 is integrally provided with the output member 21 on an outer peripheral surface 21*a* of the output member 21. Moreover, the hybrid drive system 1 includes the output bearing 61 that is arranged on the radially inner side of the output member 21 and rotatably supports the output member 21 from the radially inner side. The output bearing 61 and the output gear 22 are arranged overlapping in the axial direction. The hybrid drive system 1 in which the overall system can be made shorter in the axial direction is realized by the combination of these arrangements. Hereinafter, the hybrid drive system 1 according to this example embodiment will be described in more detail. Incidentally, in the example embodiments, the term "overlap" in a given direction of two members means that each of the two members has at least a portion that is in the same position in terms of the arrangement in the given direction.

1. Overall Structure of the Hybrid Drive System

Figure 1:
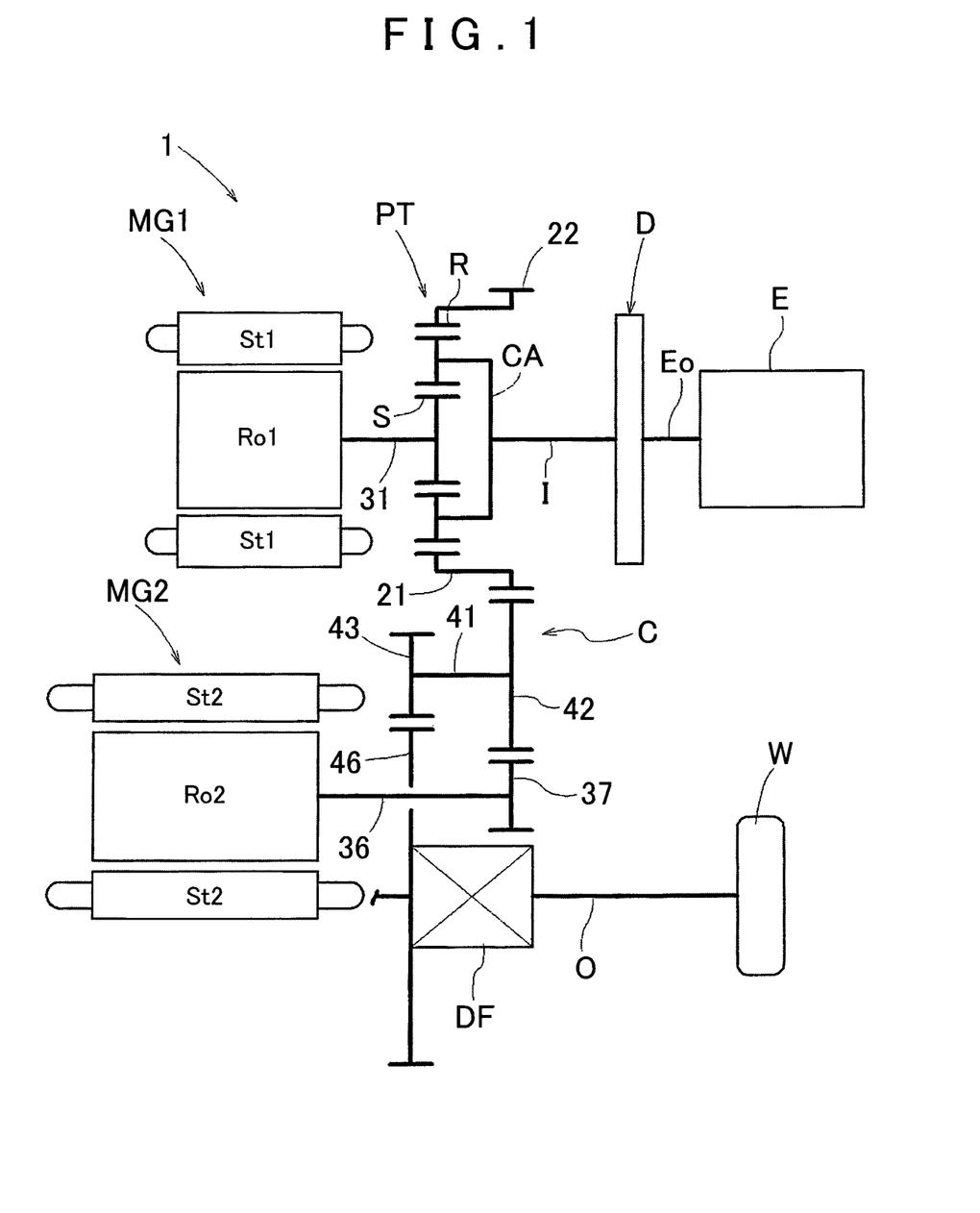
FIG. 1 skeleton view of a hybrid drive system according to an example embodiment of the present invention.

First, the overall structure of the hybrid drive system 1 according to this example embodiment will be described. As shown in FIGS. 1 and 3, the input shaft I is drivingly connected to the engine E. Here, the engine E is an internal combustion engine that is driven by the combustion of fuel. Any of a variety of types of known engines, such as a gasoline engine or a diesel engine or the like, may be used. In this example, the input shaft I is drivingly connected to an engine output shaft Eo such as a crankshaft of the engine E via a damper D. Incidentally, the input shaft I may be drivingly connected to the engine output shaft Eo via the damper D and a clutch or the like, or directly without going through the damper D and a clutch or the like. In this example embodiment, the input shaft I functions as an input member of the present invention.

The first motor-generator MG1 has a first stator St1 that is fixed to a case 2, and a first rotor Ro1 that is rotatably supported on the radially inner side of the first stator St1. The first rotor Ro1 is drivingly connected to a sun gear S of the power transfer PT so as to rotate together with the sun gear S. The first motor-generator MG1 is able to function as a motor (i.e., an electric motor) that receives a supply of electric power and generates power (i.e., driving force), as well as function as a generator (i.e., an electric generator) that receives a supply of power (i.e., driving force) and generates electric power. Therefore, the first motor-generator MG1 is electrically connected to a power storage device, not shown. In this example, a battery is used as the power storage device. Incidentally, a capacitor or the like may also be used as the power storage device. In this example, the first motor-generator MG1 mainly functions as a generator that generates electric power with torque from the input shaft I (i.e., the engine E) that is input via the power transfer PT and charges the battery, or supplies electric power for driving the second motor-generator MG2. However, at times such as when the vehicle is running at high speeds or when the engine E is started, the first motor-generator MG1 may also function as a motor that outputs driving force.

The second motor-generator MG2 has a second stator St2 that is fixed to the case 2, and a second rotor Ro2 that is rotatably supported on the radially inner side of the second stator St2. The second rotor Ro2 is drivingly connected to a second motor-generator output gear 37 so as to rotate together with the second motor-generator output gear 37. The second motor-generator MG2 is able to function as a motor (i.e., an electric motor) that receives a supply of electric power and generates power (i.e., driving force), as well as function as a generator (i.e., an electric generator) that receives a supply of power (i.e., driving force) and generates electric power. Therefore, the second motor-generator MG2 is electrically also connected to a battery as a power storage device, not shown. In this example, the second motor-generator MG2 mainly functions as a motor that assists with providing driving force for running the vehicle. However, at times such as when the vehicle is running at low speeds, the second motor-generator MG2 may also function as a generator that regenerates the inertia force of the vehicle as electric energy.

In this example embodiment, the power transfer PT is a single pinion planetary gear set that is arranged on the same axis as the input shaft I. That is, the power transfer PT has three rotating elements, i.e., a carrier CA that supports a plurality of pinion gears, and a sun gear S and a ring gear R that are both in mesh with the pinion gears. The sun gear S is drivingly connected to a first rotor shaft 31 of the first rotor Ro1 of the first motor-generator MG1 so as to rotate together with the first rotor shaft 31. The carrier CA is drivingly connected to the input shaft I so as to rotate together with the input shaft I. The ring gear R is integrally formed with the output member 21. In order of rotation speed, these three rotating elements of the power transfer PT are 1) the sun gear (i.e., a first rotating element), 2) the carrier CA (i.e., a second rotating element), and 3) the ring gear R (i.e., a third rotating element). Incidentally, the order of rotation speed refers to either the order from high speed to low speed, or the order from low speed to high speed, and may be either depending on the rotation state of the planetary gear set that makes up the power transfer PT. In any case, the order of the rotating elements does not change.

The power transfer PT distributes and transmits the torque from the engine E that is transmitted to the input shaft I to the first motor-generator MG1 and the output member 21. In the power transfer PT, the input shaft I is drivingly connected to the carrier CA that is in the middle in the order of rotation speed. Also, the first rotor Ro1 of the first motor-generator MG1 is drivingly connected to the sun gear S that is on one side in the order of rotation speed, and the ring gear R that is on the other side in the order of rotation speed is integrally formed with the output member 21. With the hybrid drive system 1 according to this example embodiment, forward torque (i.e., torque in the forward direction) from the engine E is transmitted via the input shaft I to the carrier CA that is in the middle in the order of rotation speed, and negative torque (i.e., torque in the negative direction) output from the first motor-generator MG1 is transmitted via the first rotor shaft 31 to the sun gear S that is on one side in the order of rotation speed. The negative torque of the first motor-generator MG1 serves to receive the reaction force of the torque of the engine E, and as a result, the power transfer PT distributes some of the torque from the engine E that is transmitted to the carrier CA via the input shaft I to the first motor-generator MG1, and transmits torque that has been attenuated with respect to the torque of the engine E to the output member 21 via the ring gear R.

Here, in this example embodiment, the output member 21 is a generally circular cylindrical member provided surrounding the radially outer side of the power transfer PT. The ring gear R of the power transfer PT is integrally formed with the output member 21 on the inner peripheral surface 21*b* of the output member 21, and the output gear 22 is integrally formed with the output member 21 on the outer peripheral surface 21*a* of the output member 21. That is, in this example embodiment, ring gear R of the power transfer PT and the output gear 22 are integrally formed on the inner and outer peripheral surfaces, respectively, of the output member 21. As a result, torque that has been transmitted to the output member 21 via the ring gear R of the power transfer PT is able to be output to the wheel W side via the output gear 22.

The hybrid drive system 1 according to this example embodiment also includes a counter gear mechanism C. The counter gear mechanism C reverses the rotational direction of the output gear 22 and also transmits the torque that is output from the output gear 22 to the wheel W side. This counter gear mechanism C is formed with a counter shaft 41, a first gear 42, and a second gear 43. The first gear 42 is in mesh with the output gear 22. Moreover, the first gear 42 is also in mesh with the second motor-generator output gear 37 at a different position in the circumferential direction than the output gear 22. The second gear 43 is in mesh with a differential input gear 46 of an output differential gear unit DF that will be described later. Therefore, the counter gear mechanism C reverses the rotational directions of the output gear 22 and the second motor-generator output gear 37, and transmits the torque that is transmitted to the output gear 22 and the torque of the second motor-generator MG2 to the output differential gear unit DF.

Also, the hybrid drive system 1 according to this example embodiment also includes the output differential gear unit DF. The output differential gear unit DF has the differential input gear 46 and distributes and transmits torque that is transmitted to the differential input gear 46 to a plurality of wheels W. In this example, the output differential gear unit DF is a differential gear mechanism with a plurality of bevel gears that are in mesh with each other. This output differential gear unit DF splits the torque that is transmitted to the differential input gear 46 via the second gear 43 of the counter gear mechanism C, and transmits the split torque to each of two wheels W on the left and right, via an axle O. Incidentally, at this time, the output differential gear unit DF reverses the rotational direction of the second gear 43 and transmits the reversed rotation to the wheels W. As a result, when the vehicle is traveling forward, the hybrid drive system 1 runs the vehicle by rotating the wheels W in the same direction as the rotational direction of the input shaft I (i.e., the engine E), and transmitting torque that is in the same direction as the torque of the input shaft I (i.e., the engine E) and the second motor-generator MG2 to the wheels W.

Figure 2:
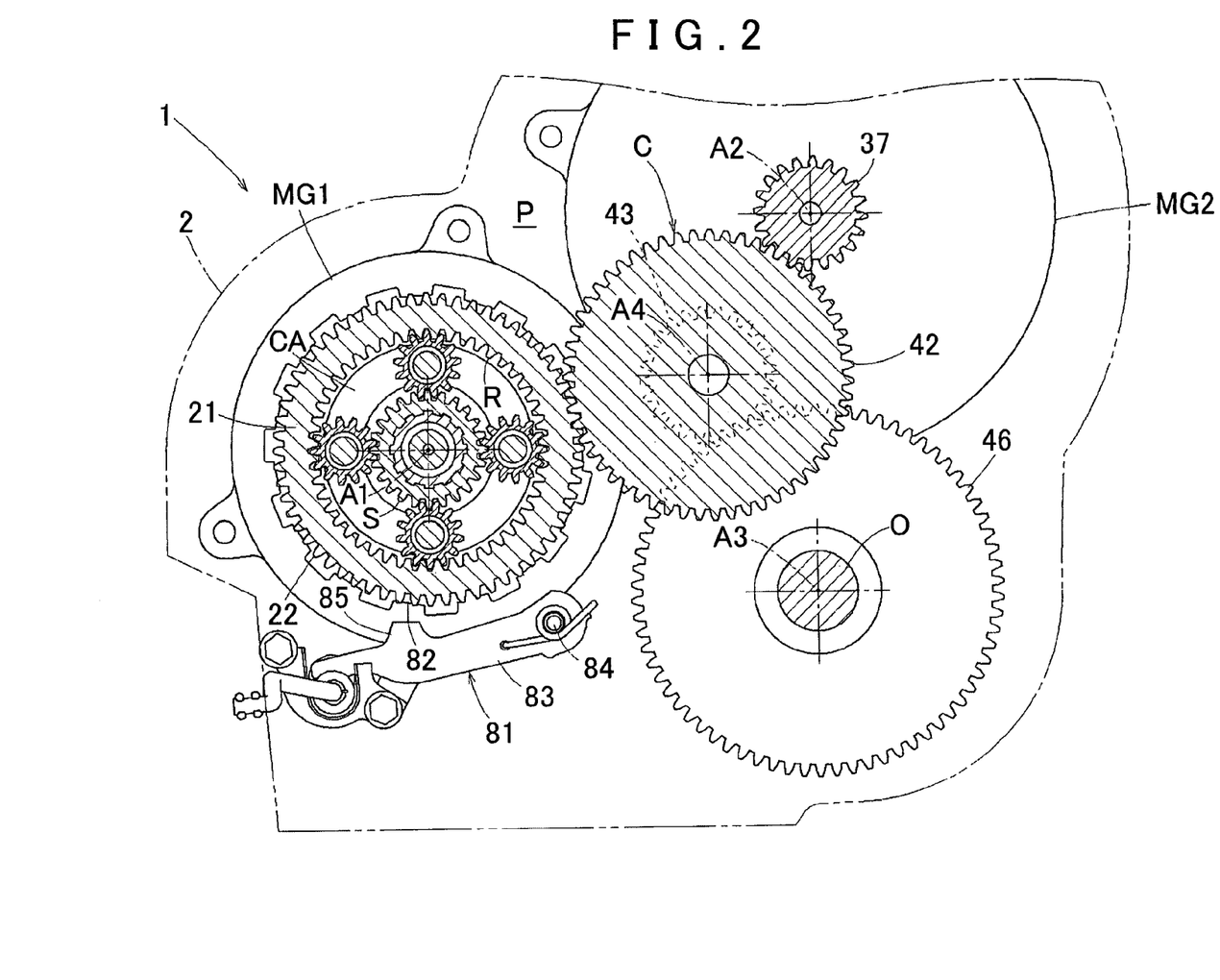
FIG. 2 sectional view of a surface orthogonal to the axial direction of the hybrid drive system according to the example embodiment of the present invention.

Incidentally, the hybrid drive system 1 according to this example embodiment has a four-axis configuration that includes four separate axes, i.e., a first axis A1 on which the input shaft I, the power transfer PT, and the first motor-generator MG1 are arranged, a second axis A2 on which the second motor-generator MG2 is arranged, a third axis A3 on which the output differential gear unit DF is arranged, and a fourth axis A4 on which the counter gear mechanism C is arranged, as shown in FIG. 2. The first axis A1, the second axis A2, the third axis A3, and the fourth axis A4 are all parallel to one another. Also, in the example in the drawings, the first axis A1, the second axis A2, and the third axis A3 are arranged such that, when viewed from the axial direction, the lines that connect these axes form a triangle, and the fourth axis A4 is arranged inside that triangle when viewed from the axial direction.

2. Mechanical Structures of Various Portions of the Hybrid Drive System

Next, the mechanical structures of various portions of the hybrid drive system 1 according to the example embodiment will be described. The input shaft I, the first motor-generator MG1, the second motor-generator MG2, the power transfer PT, the output member 21, the output gear 22, the counter gear mechanism C, and the output differential gear unit DF described above are all housed inside a case 2. As shown in FIG. 3, in this example embodiment, the case 2 can be divided into a case main body 2a, a front cover 2b that is able to be attached to one side of the case main body 2a in the axial direction (i.e., the right side in FIG. 3; hereafter referred to as "the one side in the axial direction"), and a rear cover 2c that is able to be attached to the other side of the case main body 2a in the axial direction (i.e., the left side in FIG. 3; hereafter referred to as "the other side in the axial direction"). These are fastened and fixed together using fastening members such as bolts.

Mainly the first motor-generator MG1 and the second motor-generator MG2 are housed in the case main body 2a. Also, mainly the input shaft I, the power transfer PT, the output member 21, the output gear 22, the counter gear mechanism C, and the output differential gear unit DF are housed in a housing space P formed between the case main body 2a and the front cover 2b. The case main body 2a includes a case peripheral wall 3 formed in an irregular shape so as to cover the outer peripheries of at least the first motor-generator MG1 and the second motor-generator MG2, and an intermediate supporting wall 7 that blocks an end portion opening on the one side of the case peripheral wall 3 in the axial direction. The case peripheral wall 3 and the intermediate supporting wall 7 are integrally formed. Also, the front cover 2b includes a dividing wall 10 that is formed in an irregular shape so as to cover the outer peripheries of at least the power transfer PT, the output member 21, the output gear 22, the counter gear mechanism C, and the output differential gear unit DF, and an end portion supporting wall 4 that blocks off an end portion opening on the one side of the dividing wall 10 in the axial direction. The dividing wall 10 and the end portion supporting wall 4 are integrally formed. The rear cover 2c is formed as a generally plate-shaped member that has a shape that corresponds to the outer shape of the case peripheral wall 3 so as to block an end portion opening on the other side of the case peripheral wall 3 of the case main body 2a in the axial direction.

The end portion supporting wall 4 has a shape that extends at least in the radial direction. In this example embodiment, the end portion supporting wall 4 extends in the radial direction and the circumferential direction. A through hole in the axial direction is formed in the end portion supporting wall 4. The input shaft I inserted through this through-hole passes through the end portion supporting wall 4 and is inserted into the case 2. The end portion supporting wall 4 includes a cylindrical (a boss-shaped) axially protruding portion 5 that protrudes toward the other side in the axial direction (i.e., toward the side with the power transfer PT that is the side with the housing space P when viewed from the end portion supporting wall 4) around the input shaft I. In addition, the end portion supporting wall 4 also includes a cylindrical (a boss-shaped) axially protruding portion 6 that also protrudes toward the other side in the axial direction in a position a predetermined distance away from the axially protruding portion 5 on the radially outer side of the axially protruding portion 5. The axially protruding portion 5 and the axially protruding portion 6 are both integrally formed with the end portion supporting wall 4.

The intermediate supporting wall 7 has a shape that extends at least in the radial direction. In this example embodiment, the intermediate supporting wall 7 extends in the radial direction and the circumferential direction. A through hole in the axial direction is formed in the intermediate supporting wall 7. The first rotor shaft 31 of the first motor-generator MG1 inserted through this through-hole passes through the intermediate supporting wall 7 and is connected to the sun gear S of the power transfer PT in the housing space P. The intermediate supporting wall 7 includes a cylindrical (a boss-shaped)

axially protruding portion 8 that protrudes toward the one side in the axial direction (i.e., toward the side with the power transfer PT that is the side with the housing space P when viewed from the intermediate supporting wall 7) around the first rotor shaft 31. This axially protruding portion 8 is integrally formed with the intermediate supporting wall 7. Therefore, in this example, the axially protruding portion 5 and the axially protruding portion 6 that are integrally formed with the end portion supporting wall 4 and the axially protruding portion 8 that is integrally formed with the intermediate supporting wall 7 are arranged facing each another in the housing space P. In this example embodiment, the intermediate supporting wall 7 functions as the supporting wall of the present invention, and the axially protruding portion 8 of the intermediate supporting wall 7 functions as the cylindrical portion of the present invention.

As shown in FIG. 3, a pump cover 2*d* is attached to an end surface of the rear cover 2*c* on the one side in the axial direction, i.e., the side toward the inside of the case 2. The pump cover 2*d* is fastened and fixed to the rear cover 2*c* by a fastening member such as a bolt while the pump cover 2*d* is in contact with the one side of the rear cover 2*c* in the axial direction. A pump chamber is formed between the rear cover 2*c* and the pump cover 2*d*, and an oil pump 55 is arranged in this pump chamber. In this example embodiment, an internal gear pump that has an inner rotor and an outer rotor is used for this kind of the oil pump 55. In this example embodiment, the inner rotor of the oil pump 55 is driven by a tubular pump driving shaft 54 that is connected to the input shaft I so as to rotate together with the input shaft I. Oil discharged from the oil pump 55 passes through an in-shaft oil passage 52 formed inside the pump driving shaft 54 and the input shaft I, and is supplied to the power transfer PT, a plurality of gears, and a plurality of bearings, and the like, thereby lubricating and cooling these parts. The pump cover 2*d* includes a cylindrical (i.e., a boss-shaped) axially protruding portion 9 that protrudes out toward the one side in the axial direction (i.e., the side with the first motor-generator MG1 that is the side toward the inside of the case 2). This axially protruding portion 9 is integrally formed with the pump cover 2*d*.

The input shaft I is a shaft for inputting torque from the engine E into the hybrid drive system 1, and is connected to the engine E at an end portion on the one side in the axial direction, as shown in FIGS. 3 and 4. Here, the input shaft I is arranged passing through the case 2, and is connected to the engine output shaft Eo of the engine E via a damper D on the one side of the end portion supporting wall 4 in the axial direction, so as to rotate together with the engine output shaft Eo. The damper D is a device that transmits the rotation of the engine output shaft Eo to the input shaft I while damping (i.e., attenuating) torsional vibration of the engine output shaft Eo. Any of a variety of known devices can be used for this damper D. In this example embodiment, the damper D has a shape in which the width in the axial direction becomes narrower farther from the input shaft I toward the outside in the radial direction, and that is symmetrical in the axial direction. The input shaft I is rotatably supported by the axially protruding portion 5 of the end portion supporting wall 4 via a first needle bearing 69. Also, an oil seal 59 for inhibiting oil from leaking out to the one side (i.e., the side with the damper D and the engine E) in the axial direction is arranged between the end portion supporting wall 4 and the input shaft I. Also in this example embodiment, the first rotor shaft 31 of the first motor-generator MG1 is formed in a tubular shape with a through-hole in the axial direction formed inside of it. The end portion on the other side of the input shaft I in the axial direction is inserted into the through-hole of the first rotor shaft 31. At this time, the input shaft I is rotatably supported by the first rotor shaft 31 via a second needle bearing 70.

The input shaft I has a flange portion 51 that extends in the radial direction from the input shaft I, on a center portion in the axial direction. This flange portion 51 is integrally formed with the input shaft I. The flange portion 51 passes between the sun gear S that is connected to the first rotor shaft 31 of the first motor-generator MG1 and the axially protruding portion 5 of the end portion supporting wall 4, and is connected to the carrier CA of the power transfer PT. The sun gear S and the axially protruding portion 5 of the end portion supporting wall 4 are in contact with each other via a first thrust bearing 67 and a second thrust bearing 68 on both sides of the flange portion 51 in the axial direction. That is, the first thrust bearing 67 is arranged between an end surface on the one side of the flange portion 51 in the axial direction and an end surface on the other side of the axially protruding portion 5 in the axial direction, so as to contact both of those end surfaces. Also, the second thrust bearing 68 is arranged between an end surface on the other side of the flange portion 51 in the axial direction and an end surface on the one side of the sun gear S in the axial direction, so as to contact both of those end surfaces.

The first rotor shaft 31 is a shaft for inputting torque from the first motor-generator MG1 to the sun gear S of the power transfer PT (or for inputting torque that is transmitted to the sun gear S to the first motor-generator MG1), and is spline-connected to the sun gear S at an end portion on the one side in the axial direction, as shown in FIGS. 3 and 4. The first rotor shaft 31 is rotatably supported by the axially protruding portion 8 of the intermediate supporting wall 7 via a first rotor bearing 63. The first rotor shaft 31 is also rotatably supported by the axially protruding portion 9 of the pump cover 2*d* via a second rotor bearing 64 at a different position in the axial direction than the first rotor bearing 63 (i.e., at an end portion on the other side in the axial direction in this example). In this example embodiment, a rotation sensor 57 for detecting a rotation phase of the first rotor Ro1 of the first motor-generator MG1 is arranged encompassing the first rotor shaft 31. This rotation sensor 57 is arranged adjacent to, on the one side of, the second rotor bearing 64 and the pump cover 2*d* in the axial direction. A resolver or the like may be used as this kind of rotation sensor 57. In this example embodiment, the first rotor bearing 63 functions as the rotor bearing of the present invention.

The output member 21 is arranged on the radial outer side of the sun gear S and the carrier C, and surrounding the sun gear S and the carrier C. The output member 21 is a cylindrical member that occupies almost all of the housing space P in the axial direction. The ring gear R of the power transfer PT is integrally formed with the output member 21 on the inner peripheral surface 21*b* of the output member 21. The ring gear R is formed on a center portion of the output member 21 in the axial direction. In this example, the output member 21 has two step portions 23 and 24 in the axial direction formed on the inner peripheral surface 21*b*. Here, the steps in the axial direction on the inner peripheral surface are portions that are formed in predetermined positions in the axial direction of the output member 21, in which the inner diameter of the output member 21 changes at those positions. The inner diameter of the portion between these two step portions 23 and 24 in the axial direction is formed smaller than the inner diameter of the portions to the outsides of these two step portions 23 and 24 in the axial direction. The ring gear R is formed on the inner peripheral surface 21*b* of the output member 21 at the small diameter portion. Accordingly, the entire power transfer PT is arranged overlapping in the axial direction with the output member 21 on the radially inner side of the output member 21.

The output member 21 is rotatably supported with respect to the case 2 at a plurality (two in this example) of locations in the axial direction. In this example embodiment, the output member 21 is rotatably supported at both end portions in the axial direction with respect to the case 2 via a first output bearing 61 and a second output bearing 62 that are arranged on the radially inner side of the output member 21. More specifically, the output member 21 is rotatably supported at an end portion on the one side in the axial direction via the first output bearing 61 that is arranged between a large diameter portion on the one side of the inner peripheral surface 21*b* in the axial direction and the axially protruding portion 6 of the end portion supporting wall 4. Also, the output member 21 is rotatably supported at an end portion on the other side in the axial direction via the second output bearing 62 that is arranged between a large diameter portion on the other side of the inner peripheral surface 21*b* in the axial direction and the axially protruding portion 8 of the intermediate supporting wall 7. In this way, the output member 21 is rotatably supported from the radially inner side by the two output bearings 61 and 62, with respect to the axially protruding portion 6 of the end portion supporting wall 4 and the axially protruding portion 8 of the intermediate supporting wall 7 that are arranged facing each other in the housing space P. Employing a structure in which the output member 21 is supported from the radially inner side in this way enables the two output bearings 61 and 62 to be made with a smaller diameter compared with a structure in which the output member 21 is supported from the radially outer side.

The output gear 22 is formed on the outer peripheral surface 21*a* of the output member 21. That is, in this example embodiment, the output gear 22 is integrally formed with the output member 21 on the outer peripheral surface 21*a* of the output member 21, instead of being formed on, for example, a sleeve-shaped member that has a relatively small diameter and is connected to the output member 21 in the radial direction via another member and formed surrounding the input shaft I, for example (see FIG. 4 and the like in JP-A-2000-217205). As described above, in this example embodiment, the output member 21 is supported from the radially inner side by the two output bearings 61 and 62, so the position in the axial direction where the output gear 22 is formed on the outer peripheral surface 21*a* of the output member 21 is not limited by the two output bearings 61 and 62. Therefore, this kind of structure is advantageous in that provides an extremely high degree of freedom regarding the position of the output gear 22 in the axial direction.

Therefore, in this example embodiment, the output gear 22 is formed in a position nearer the end portion on the one side (i.e., the side nearer the engine E) of the output member 21 in the axial direction. As a result, the various structures of the counter gear mechanism C, the second motor-generator MG2, and the output differential gear unit DF and the like that are arranged downstream of the output gear 22 in the power transmitting path can be arranged nearer the one side (i.e., the side nearer the engine E) in the axial direction. Incidentally, with this kind of positioning of the output gear 22, the output gear 22 is arranged overlapping in the axial direction with the first output bearing 61 that is also arranged on the end portion on the one side in the axial direction, on the radially inner side of the output member 21. Accordingly, the length of the space in which the output member 21, the first output bearing 61, and the output gear 22 are arranged in the axial direction is shorter than it is when the output member 21, the first output bearing 61, and the output gear 22 are arranged lined up in the axial direction.

Also, in this example embodiment, a parking gear 82 is formed on an end portion on the other side (i.e., the side near the intermediate supporting wall 7) of the outer peripheral surface 21*a* of the output member 21 in the axial direction. The parking gear 82 is integrally formed with the output member 21. The parking gear 82 is arranged overlapping in the axial direction with the second output bearing 62 that is also arranged on an end portion on the other side in the axial direction, on the radially inner side of the output member 21. Accordingly, the length of the space in which the output member 21, the second output bearing 62, and the parking gear 82 are arranged in the axial direction is shorter than it is when the output member 21, the second output bearing 62, and the parking gear 82 are arranged lined up in the axial direction. This parking gear 82 forms a portion of a parking lock mechanism 81. In this example embodiment, the parking lock mechanism 81 has a locking member 83 structured so as to be able to pivot about a predetermined pivot support 84, and a pawl portion 85 is integrally formed on this locking member 83, as shown in FIG. 2. The locking member 83 and the pawl portion 85 are made to pivot within a predetermined range of movement by a cam mechanism or the like, not shown. While the pawl portion 85 and the parking gear 82 are engaged by the pawl portion 85 being in mesh with the parking gear 82, the parking lock mechanism 81 forcibly stops the output member 21 from rotating. On the other hand, while the pawl portion 85 and the parking gear 82 are disengaged by the pawl portion 85 not being in mesh with the parking gear 82, the parking lock mechanism 81 allows the output member 21 to rotate. In this example embodiment, the parking gear 82 functions as the gear portion of the present invention, and the parking lock mechanism 81 functions as the lock mechanism of the present invention.

A second rotor shaft 36 is a shaft for inputting driving force from the second motor-generator MG2 to the second motor-generator output gear 37 that is integrally formed with a shaft member 38. An inner peripheral surface at an end portion on the one side of the second rotor shaft 36 in the axial direction is spline-connected to an outer peripheral surface of an end portion on the other side of the shaft member 38 in the axial direction, as shown in FIG. 3. The second rotor shaft 36 and the shaft member 38 that rotate together are rotatably supported by the case 2 via a plurality of bearings at a plurality of positions in the axial direction. Also, although not shown, a rotation sensor such as a resolver for detecting a rotation phase of the second rotor Rot of the second motor-generator MG2 is provided encircling the second rotor shaft 36.

The first gear 42 and the second gear 43 that form the counter gear mechanism C are both integrally formed with the counter shaft 41. Therefore, the counter shaft 41, the first gear 42, and the second gear 43 all rotate together. In this example embodiment, the second gear 43 is arranged on the other side of the first gear 42 in the axial direction. Also, the counter shaft 41 is rotatably supported with respect to the case 2 at a plurality of locations (two locations in this example) in the axial direction. In this example, the counter shaft 41 is rotatably supported with respect to the case 2 via a first counter bearing 65 at an end portion on the one side in the axial direction, and rotatably supported with respect to the case 2 via a second counter bearing 66 at an end portion on the other side in the axial direction. A first gear supporting member 44 that supports the first gear 42 is arranged adjacent to the other side of the first counter bearing 65 in the axial direction, and a second gear supporting member 45 that supports the second gear 43 is arranged adjacent to the one side of the second counter bearing 66 in the axial direction. Incidentally, the number of teeth on the second gear 43 is set less than the number of teeth on the first gear 42. The gear ratio (the ratio between the numbers of the teeth) of these gears may be changed as appropriate according to the vehicle characteristics and the like.

As shown in FIGS. 2 and 3, the first gear 42 is in mesh with both the output gear 22 and the second motor-generator output gear 37. In this example embodiment, the second motor-generator MG2 basically outputs a relatively large amount of assist torque for driving the vehicle. Thus, when comparing the maximum value of torque able to be transmitted from the output gear 22 to the first gear 42 with the maximum value of torque able to be transmitted from the second motor-generator output gear 37 to the first gear 42, the latter is larger. Therefore, with the hybrid drive system 1 according to this example embodiment, the length of the second motor-generator output gear 37 in the axial direction is set longer than the length of the output gear 22 in the axial direction in order to enable a larger amount of torque to be transmitted. In this example embodiment, the length of the first gear 42 in the axial direction is set equal to the length of the second motor-generator output gear 37 in the axial direction in order to enable the torque output by the second motor-generator MG2 to be efficiently transmitted to the first gear 42, while inhibiting an increase in the dimensions of the overall hybrid drive system 1 in the axial direction. As a result, the length of the first gear 42 in the axial direction is longer than the length of the output gear 22 in the axial direction. Thus, the first gear 42 has a portion that is not in mesh with the output gear 22 (here, this portion will be referred to as a "non-meshing portion N" (see FIG. 4)).

The intermesh position of the first gear 42 and the output gear 22 is set such that the first gear 42 and the output gear 22 mesh each other with the end portions on the other side in the axial direction aligned with each other. In other words, the intermesh position of the first gear 42 and the output gear 22 is set such that the entire non-meshing portion N of the first gear 42 is on the one side (i.e., the side nearer the engine E) of the output gear 22 in the axial direction. In this example embodiment, the non-meshing portion N is arranged in a position overlapping in the axial direction with the first counter bearing 65 that is arranged adjacent to the one side (i.e., the side nearer the engine E) of the first gear 42 in the axial direction. Incidentally, the end portion supporting wall 4 at the radial position that corresponds to the portion where the output gear 22 and the first gear 42 mesh (or to the non-meshing portion N) is formed thin in the axial direction, as shown in FIG. 4. The non-meshing portion N of the first gear 42 is arranged in an open space formed on the radially outer side, on the side with the counter gear mechanism C, of the axially protruding portion 6 of the end portion supporting wall 4. Accordingly, the counter gear mechanism C can be arranged as close to the one side (i.e., the side nearer the engine E) in the axial direction as possible by effectively utilizing the open space formed to the radially outer side of the axially protruding portion 6. Also, as a result, the second motor-generator MG2 and the output differential gear unit DF that are directly drivingly connected to the counter gear mechanism C are also able to be arranged as close to the one side (i.e., the side nearer the engine E) in the axial direction as possible.

3. Arrangement of the Various Portions of the Hybrid Drive System

Next, the arrangement of the various portions of the hybrid drive system 1 according to this example embodiment will be described. Here, the arrangement of mainly the various component parts housed in the housing space P will be described according to the characteristic structure of the present invention. In particular, the arrangement of the various component parts around the first output bearing 61 and the second output bearing 62 that rotatably support the output member 21 will be described.

First, the description will focus on the arrangement of the various component parts around the second output bearing 62. The first rotor bearing 63 is arranged overlapping in the axial direction with the second output bearing 62, on the radially inner side of the second output bearing 62. In this example embodiment, the second output bearing 62 and the first rotor bearing 63 are both arranged contacting the axially protruding portion 8 that is integrally formed with the intermediate supporting wall 7. Here, the length of the axially protruding portion 8 in the axial direction is slightly longer than the lengths of the second output bearing 62 and the first rotor bearing 63 in the axial direction. The second output bearing 62 is arranged contacting an outer peripheral surface 8a of the axially protruding portion 8, with the end portion on the one side of the second output bearing 62 in the axial direction aligned with the end portion on the one end side of the axial protruding portion 8 in the axial direction. Meanwhile, the first rotor bearing 63 is arranged contacting an inner peripheral surface 8b of the axially protruding portion 8, with the end portion on the other side of the first rotor bearing 63 in the axial direction aligned with the end portion on the other side of the axial protruding portion 8 in the axial direction. Accordingly, a portion (i.e., the majority in this example) on the one side of the first rotor bearing 63 in the axial direction is arranged overlapping in the axial direction with a portion on the other side of the second output bearing 62 in the axial direction.

Also, in this example embodiment, the second gear 43 of the counter gear mechanism C is arranged overlapping in the axial direction with the second output bearing 62, on the radially outer side of the second output bearing 62. Moreover, the second gear 43 is also arranged overlapping in the axial direction with the first rotor bearing 63, on the radially outer side of the first rotor bearing 63. In this example, the entire second output bearing 62 and the entire first rotor bearing 63 both are arranged overlapping in the axial direction with the second gear 43. With this kind of structure, the first rotor bearing 63, the second output bearing 62, and the second gear 43 all overlap with each other in the axial direction. Incidentally, in this example embodiment, the parking gear 82 formed on the outer peripheral surface 21a of the output member 21 is arranged overlapping in the axial direction with the second output bearing 62, so the first rotor bearing 63, the second output bearing 62, the parking gear 82, and the second gear 43 all overlap with each other in the axial direction.

Next, the description will focus on the arrangement of the various component parts around the first output bearing 61. The output gear 22 is arranged overlapping in the axial direction with the first output bearing 61, on the radially outer side of the first output bearing 61. As described above, the output gear 22 is integrally formed nearer the end portion on the one side of the output member 21 in the axial direction, on the outer peripheral surface 21a of the output member 21. Also, the first output bearing 61 is arranged contacting the inner peripheral surface 21b of the output member 21, with the end portion on the one side of the first output bearing 61 in the axial direction aligned with the end portion on the one side of the output member 21 in the axial direction. Accordingly, a portion on the one side of the output gear 22 in the axial direction is arranged overlapping in the axial direction with a portion (i.e., the majority in this example) on the other side of the first output bearing 61 in the axial direction. Incidentally, because the first gear 42 of the counter gear mechanism C is in mesh with the output gear 22, the first gear 42 naturally also overlaps in the axial direction with the first output bearing 61.

Also, in this example embodiment, the first needle bearing 69 is arranged overlapping in the axial direction with the first output bearing 61, on the radially inner side of the first output bearing 61. In this example, the first needle bearing 69 is arranged so that almost all of it overlaps with the first output bearing 61 in the axial direction. Furthermore, in this example embodiment, the first counter bearing 65 is arranged overlapping in the axial direction with the first output bearing 61, on the radially outer side of the first output bearing 61. In this example, the first counter bearing 65 is arranged such that a portion thereof on the other side in the axial direction slightly overlaps in the axial direction with a portion on the one side of the first output bearing 61 in the axial direction. Accordingly, in this example embodiment, the first needle bearing 69, the first output bearing 61, the output gear 22, the first gear 42, and the first counter bearing 65 all overlap in the axial direction.

Incidentally, referring to FIG. 4, with the structure of this example embodiment, the first output bearing 61, the non-meshing portion N of the first gear 42, and the first counter bearing 65 are arranged in this order radially outward from the input shaft I, and the amount that each extends out toward the one side (i.e., the side nearer the engine E) in the axial direction increases in this order. The end portion supporting wall 4 also has a shape that is stepped accordingly. However, in this example embodiment, the shape of the damper D arranged between the end portion supporting wall 4 and the engine E is such that the width of the damper D in the axial direction becomes narrower farther from the input shaft I toward the outside in the radial direction, and is symmetrical in the axial direction. Thus, these component parts have complementary shapes in the axial direction and are arranged facing one another, so problems such the parts leading to an increase in the axial dimensions is practically nonexistent.

With the hybrid drive system 1 according to this example embodiment, the output gear 22 is formed on the outer peripheral surface 21a of the output member 21 that is formed in a cylindrical shape. Therefore, the length of the space occupied by the output member 21 and the output gear 22 (and other members if such members are interposed between the output member 21 and the output gear 22) in the axial direction is extremely short, i.e., equal to the length of the output member 21 in the axial direction. Furthermore, in this example embodiment, the power transfer PT is arranged overlapping with the output member 21 in the axial direction, on the radially inner side of the output member 21 that is formed with a short shaft length. Also, regarding the arrangement of the various component parts, an arrangement such as that described above around the two output bearings 61 and 62 that rotatably support the output member 21 is employed. As a result, all of the component parts, i.e., the power transfer PT, the first output bearing 61, the second output bearing 62, the first rotor bearing 63, the parking gear 82, the first gear 42, and the second gear 43 and the like, are able to be arranged within the space occupied by the output member 21 in the axial direction (which is substantially equal to the housing space P).

Also, in this example embodiment, the first motor-generator MG1 is able to be arranged near the power transfer PT and the output member 21 in the axial direction by arranging the first rotor bearing 63 so that it overlaps with the second output bearing 62 in the axial direction. Accordingly, the length of the space occupied by the first motor-generator MG1, the output member 21, and the output gear 22 (and other members if such members are interposed between the output member 21 and the output gear 22) in the axial direction is also able to be made significantly shorter. As a result, with the hybrid drive system 1 according to this example embodiment, the dimensions of the overall system in the axial direction are able to be significantly shorter compared with the related art.

[Other Example Embodiments]

(1) In the example embodiment described above, both the first output bearing 61 and the second output bearing 62 are arranged on the radially inner side of the output member 21, and the output member 21 is rotatably supported from the radially inner side by the two output bearings 61 and 62. However, the present invention is not limited to this. That is, as long as at least the first output bearing 61 is arranged on the radially inner side of the output member 21, the output gear 22 can be arranged overlapping with the first output bearing 61 in the axial direction. Therefore, in another example embodiment of the present invention, the second output bearing 62 is arranged on the radially outer side of the output member 21, and the output member 21 is rotatably supported from the radially outer side by the second output bearing 62 on the other side in the axial direction.

(2) In the example embodiment described above, the second output bearing 62 is arranged contacting the outer peripheral surface 8a of the axially protruding portion 8, and the first rotor bearing 63 is arranged contacting the inner peripheral surface 8b of the axially protruding portion 8. However, the present invention is not limited to this. That is, in another example embodiment of the present invention, the second output bearing 62 and the first rotor bearing 63 are arranged contacting different portions of the case 2, instead of being arranged contacting the inner and outer peripheries of a single portion of the axially protruding portion 8 and the like.

(3) In the example embodiment described above, the second gear 43 is arranged overlapping with the first rotor bearing 63 in the axial direction. However, the present invention is not limited to this. That is, in another example embodiment of the present invention, the second gear 43 is arranged in a position where it does not overlap with the first rotor bearing 63 in the axial direction. That is, in another example embodiment of the present invention, the entire second gear 43 is arranged in a different (i.e., an entirely different) position than the first rotor bearing 63 in the axial direction.

(4) In the example embodiment described above, the first rotor bearing 63 is arranged overlapping with the second output bearing 62 in the axial direction. However, the present invention is not limited to this. That is, in another example embodiment of the present invention, the first rotor bearing 63 is arranged in a position where it does not overlap with the second output bearing 62 in the axial direction. That is, in another example embodiment of the present invention, the entire first rotor bearing 63 is arranged in a different (i.e., an entirely different) position than the second output bearing 62 in the axial direction.

(5) In the example embodiment described above, the parking gear 82 that forms part of the parking lock mechanism 81 is integrally formed with the output member 21, on the outer peripheral surface 21a of the output member 21. However, the present invention is not limited to this. That is, in another example embodiment of the present invention, this kind of parking gear 82 is formed on a member other than the output member 21.

(6) In the example embodiment described above, the ring gear R of the power transfer PT is integrally formed with the output member 21, on the inner peripheral surface 21b of the output member 21, and the output gear 22 and the parking gear 82 are integrally formed with the output member 21, on the outer peripheral surface 21a of the output member 21. However, the present invention is not limited to this. That is, in another example embodiment of the present invention, any one or more of the ring gear R of the power transfer PT, the output gear 22, and the parking gear 82, for example, (referred to as an "integrated gear" at this stage) is integrally formed with another member, and the integrated gear is integrally provided with the output member 21 by fixing that other member to the output member 21. In this case, when fixing the other member on which the integrated gear is formed to the output member 21, any of a variety of structures such as fastening and fixing using welding or bolts or the like may be used.

(7) The example embodiments described in this specification, including these other structures, are in all respects merely examples, and the present invention is not limited to these. That is, as long as the structure described in the claims, or a structure equivalent thereto, is provided, all structures in which part of a structure not described in the claims has been appropriately modified are of course also included within the technical scope of the present invention.

The present invention can be suitably applied to a hybrid drive system provided with an input member that is drivingly connected to an engine, a rotating electric machine, a power distributing apparatus that distributes torque that is transmitted to the input member to the rotating electric machine and an output member, and an output gear capable of outputting torque that is transmitted to the output member to a wheel side.

The invention claimed is:

1. A hybrid drive system comprising:
an input member that is drivingly connected to an engine;
a first rotating electric machine;
an output member;
a counter gear mechanism:
a second rotating electric machine arranged on a different axis than an axis that the first rotating electric machine is arranged on;
a power distributing apparatus that distributes and transmits torque that is transmitted to the input member to the first rotating electric machine and the output member;
an output gear capable of outputting torque transmitted to the output member to a wheel side, the output gear being drivingly connected to the second rotating electric machine through the counter gear mechanism and the output gear being drivingly connected to the wheel side through the counter gear mechanism; and
an output bearing that is arranged on a radially inner side of the output member and rotatably supports the output member from the radially inner side, wherein:
the entire power distributing apparatus is arranged overlapping with the output member at a position in an axial direction on the radially inner side of the output member,
a ring gear of the power distributing apparatus is integrally provided with the output member on an inner peripheral surface of the output member,
the output gear is integrally provided with the output member on an outer peripheral surface of the output member,
the output bearing and the output gear are arranged overlapping at a position in the axial direction;
the output bearing and the output member are arranged overlapping at a position in the axial direction,
the power distributing apparatus and the first rotating electric machine are arranged in this order along the axial direction from the engine side,
the second rotating electric machine is arranged so as to: (1) overlap with a rotation shaft of the counter gear mechanism in a radial direction, (2) overlap with the first rotating electric machine in the axial direction and (3) not overlap with the output member in the radial direction, and
the output bearing is arranged on the engine side with respect to the power distributing apparatus in the axial direction.

2. The hybrid drive system according to claim 1, further comprising:
a rotor bearing that rotatably supports a rotor of the first rotating electric machine; and
a differential gear unit that has a differential input gear and distributes and transmits torque that is transmitted to the differential input gear to a plurality of wheels, wherein:
the counter gear mechanism has a first gear that meshes with the output gear, and a second gear that meshes with the differential input gear, the counter gear mechanism being formed such that the first gear and the second gear rotate together, and
the second gear and the rotor bearing are arranged overlapping at a position in the axial direction.

3. The hybrid drive system according to claim 2, wherein:
a length of the first gear in the axial direction is set longer than a length of the output gear in the axial direction, and
an intermesh position of the first gear and the output gear is set such that a non-meshing portion that is a portion of the first gear that is not in mesh with the output gear is positioned on a side on which the input member is connected to the engine, in the axial direction, and
the first gear is drivingly connected to the second rotating electric machine.

4. The hybrid drive system according to claim 3, wherein the output bearing is provided as a first output bearing,
the hybrid drive system further comprising:
a rotor bearing that rotatably supports a rotor of the first rotating electric machine; and
a second output bearing that is arranged so as to support the output member at a different position in the axial direction than a position where the first output bearing is arranged,
wherein the second output bearing and the rotor bearing are arranged overlapping at a position in the axial direction.

5. The hybrid drive system according to claim 4, further comprising:
a case in which the input member, the first rotating electric machine, the second rotating electric machine, the power distributing apparatus, the output member, and the output gear are housed,
wherein the case has a supporting wall that extends in a radial direction, and a circular cylindrical portion that is integrally formed with the supporting wall and extends in the axial direction, and the second output bearing is arranged contacting an outer peripheral surface of the cylindrical portion, and the rotor bearing is arranged contacting an inner peripheral surface of the cylindrical portion.

6. The hybrid drive system according to claim 3, further comprising:
a lock mechanism that has a gear portion and a pawl portion that is formed so as to be able to pivot about a predetermined fulcrum, and forcibly stops the output member from rotating while the pawl portion is engaged with the gear portion,
wherein the gear portion is integrally provided with the output member on an outer peripheral surface of the output member and in a different position in the axial direction than a position of the output gear.

7. The hybrid drive system according to claim 2, wherein the output bearing is provided as a first output bearing, the hybrid drive system further comprising:
a rotor bearing that rotatably supports a rotor of the first rotating electric machine; and
a second output bearing that is arranged so as to support the output member at a different position in the axial direction than a position where the first output bearing is arranged,
wherein the second output bearing and the rotor bearing are arranged overlapping at a position in the axial direction.

8. The hybrid drive system according to claim 7, further comprising:
a lock mechanism that has a gear portion and a pawl portion that is formed so as to be able to pivot about a predetermined fulcrum, and forcibly stops the output member from rotating while the pawl portion is engaged with the gear portion,
wherein the gear portion is integrally provided with the output member on an outer peripheral surface of the output member and in a different position in the axial direction than a position of the output gear.

9. The hybrid drive system according to claim 2, further comprising:
a lock mechanism that has a gear portion and a pawl portion that is formed so as to be able to pivot about a predetermined fulcrum, and forcibly stops the output member from rotating while the pawl portion is engaged with the gear portion,
wherein the gear portion is integrally provided with the output member on an outer peripheral surface of the output member and in a different position in the axial direction than a position of the output gear.

10. The hybrid drive system according to claim 1, wherein the output bearing is provided as a first output bearing, the hybrid drive system further comprising:
a rotor bearing that rotatably supports a rotor of the first rotating electric machine; and
a second output bearing that is arranged so as to support the output member at a different position in the axial direction than a position where the first output bearing is arranged,
wherein the second output bearing and the rotor bearing are arranged overlapping at a position in the axial direction.

11. The hybrid drive system according to claim 10, further comprising:
a case in which the input member, the first rotating electric machine, the second rotating electric machine, the power distributing apparatus, the output member, and the output gear are housed,
wherein the case has a supporting wall that extends in a radial direction, and a circular cylindrical portion that is integrally formed with the supporting wall and extends in the axial direction, and the second output bearing is arranged contacting an outer peripheral surface of the cylindrical portion, and the rotor bearing is arranged contacting an inner peripheral surface of the cylindrical portion.

12. The hybrid drive system according to claim 10, further comprising:
a lock mechanism that has a gear portion and a pawl portion that is formed so as to be able to pivot about a predetermined fulcrum, and forcibly stops the output member from rotating while the pawl portion is engaged with the gear portion,
wherein the gear portion is integrally provided with the output member on an outer peripheral surface of the output member and in a different position in the axial direction than a position of the output gear.

13. The hybrid drive system according to claim 1, further comprising:
a lock mechanism that has a gear portion and a pawl portion that is formed so as to be able to pivot about a predetermined fulcrum, and forcibly stops the output member from rotating while the pawl portion is engaged with the gear portion,
wherein the gear portion is integrally provided with the output member on an outer peripheral surface of the output member and in a different position in the axial direction than a position of the output gear.

14. The hybrid drive system according to claim 1, further comprising:
a differential gear unit that has a differential input gear and distributes and transmits torque that is transmitted to the differential input gear to a plurality of wheels, wherein:
the counter gear mechanism has a first gear that meshes with the output gear, and a second gear that meshes with the differential input gear, the counter gear mechanism being formed such that the first gear and the second gear rotate together, and
the second gear is arranged on a first rotating electric machine side in the axial direction with respect to the first gear and the second gear is arranged so as to overlap the output member in the axial direction.

15. The hybrid drive system according to claim 1, wherein the output bearing is provided as a first output bearing, the hybrid drive system further comprising:
a second output bearing that is arranged so as to support the output member at a different position in the axial direction than a position where the first output bearing is arranged;
a rotor shaft that is formed in a cylindrical shape and is drivingly connected to a rotor of the first rotating electric machine so as to rotate together;
a rotor bearing that rotatably support the rotor shaft; and
an input bearing that rotatably supports the input member, wherein:
the second output bearing rotatably supports the output member from the radially inner side and is arranged between the power distributing apparatus and the first rotating electric machine in the axial direction, and a connection portion between the input member and the power distributing apparatus is arranged on the engine side with respect to the power distributing apparatus in the axial direction,
the input member further includes an extending portion that extends in the axial direction from the connection portion to a position of the first rotating electric machine side with respect to the power distributing device, the extending portion being arranged in the radially inner side of the rotor shaft,
the rotor bearing is arranged between the power distributing apparatus and the first rotating electric machine in the axial direction, and
the input bearing is arranged between the power distributing apparatus and the first rotating electric machine in the axial direction and also between an inner peripheral surface of the rotor shaft and an outer peripheral surface of the extending portion.

16. The hybrid drive system according to claim 15, wherein the extending portion has a diameter smaller than a portion of the input member on the engine side with respect to the connection portion.

17. The hybrid drive system according to claim 1, further comprising:
an oil pump; and
a pump drive shaft that drives the oil pump, wherein:
the oil pump is arranged on an opposite side of the engine in the axial direction with respect to the first rotating electric machine,
the pump drive shaft extends on the radially inner side of the rotor shaft from the oil pump to the extending portion in the axial direction and is connected to the extending portion so as to rotate together, and
the pump drive shaft and the input member, in each of the radially inner portions, has an in-shaft oil passage extending in the axial direction from the oil pump to a position overlapping the power distributing apparatus in the axial direction.

\* \* \* \* \*